United States Patent [19]

Ensminger

[11] Patent Number: 4,534,696
[45] Date of Patent: Aug. 13, 1985

[54] ARTICLE TRANSFER MECHANISM

[75] Inventor: Robert J. Ensminger, Winchester, Conn.

[73] Assignee: The Arthur G. Russell Company, Incorporated, Bristol, Conn.

[21] Appl. No.: 491,817

[22] Filed: May 5, 1983

[51] Int. Cl.³ .............................................. B65G 47/90
[52] U.S. Cl. ......................................... 414/751; 74/50
[58] Field of Search .............. 414/749, 750, 751, 752, 414/753; 74/25, 27, 50, 55, 44; 901/19

[56] References Cited

U.S. PATENT DOCUMENTS

3,881,362  5/1975  Beezer .............................. 414/749 X

Primary Examiner—Joseph E. Valenza
Assistant Examiner—Dennis Williamson
Attorney, Agent, or Firm—McCormick, Paulding & Huber

[57] ABSTRACT

A transfer mechanism has a tool mounting surface movable in a generally inverted U-shaped path back and forth between spaced stations thereby making the mechanism useful, for example, as part of a pick and place device for picking up articles one at a time, or in groups at a time, from one first station and placing them at the other station. The U-shaped motion is achieved by a first body supported on a base for movement along a first axis and a second body supported on the first body for movement relative thereto about a second axis perpendicular to the first axis. The movement of the two bodies along their respective axes is achieved by a single oscillating crank arm engageable with both bodies in such a manner as to obtain a smooth gentle acceleration and deceleration of the two bodies with a minimum amount of driving force and capable of providing a short cycle time if desired.

17 Claims, 10 Drawing Figures

ARTICLE TRANSFER MECHANISM

BACKGROUND OF THE INVENTION

This invention relates to a transfer device having a tool mounting surface movable in a generally inverted U-shaped path between two stations, and deals more particularly with such a device having an improved means for obtaining such U-shaped path of movement.

The transfer mechanism of this invention may be used in various different applications where it is desired to move a part or other thing from one station to another. It was initially designed, and is so shown herein, for use as part of a pick and place device used for conveying parts through a U-shaped path from a first station to a second station as, for example, in association with an automatic assembly machine where the parts are supplied by a feeder to the first station and wherein the second station consitutes a delivery station from which the part is taken automatically for further work or assembly with other parts. The transfer machanism includes a tool mounting surface movable in the desired U-shaped path and when the mechanism is used as part of a pick and place device a suitable tool such as a gripper, vacuum head, electromagnet or the like is attached to such mounting surface for grasping an article at the first station, for holding it during movement to the second station and for releasing it at the second station.

Among various pick and place devices proposed in the past an exemplary one is shown by U.S. Pat. No. 4,095,699. Such devices generally are expected to perform their operations through thousands or millions of cycles and therefore should be of a rugged, reliable construction and drivable with a minimum amount of power. The general object of this invention is, therefore, to provide such a device which is of such a construction and yet is capable of being relatively easily and economically manufactured while being of very smooth operation. That is, in the device of the invention the acceleration and deceleration of the tool mounting surface is quite smooth so as to avoid or minimize shocks and vibration and to allow the device to be driven with a low amount of driving force.

Another object of the invention is to provide a transfer mechanism of the above character wherein there is no possibility of the motions of the movable parts getting out of sequence relative to one another.

Also, a more specific object of the invention is to provide a transfer mechanism of the above character having two bodies slidable in two coordinate directions and driven by a common crank arm in such a manner that their motions along their respective axes consist essentially of simply harmonic motions.

Other objects and advantages of the invention will be apparent from the following description of a preferred embodiment taken in conjunction with the accompanying drawings.

SUMMARY OF THE INVENTION

The invention relates to a transfer machanism, useful as part of a pick and place device, having a tool mounting surface movable along an inverted U-shaped path extending in two coordinate directions between two spaced end stations and wherein a first body is movable relative to a base along a first axis and a second body, providing the tool mounting surface, is supported on the first body for movement relative to it along a second axis perpendicular to the first axis. The invention in turn resides in a novel means for moving the first and second bodies relative to the base and relative to one another to achieve the desired motion of the tool mounting surface with such means including a single oscillation crank arm engageable with both of the bodies for moving them with simple harmonic motion along their respective axes.

Still more particularly the invention resides in the means for moving the first and second bodies including two separate protruding members, such as rollers, on the crank arm, with the first of the protruding members being received between two parallel surfaces on the first body and with the other protruding member being received between two parallel surfaces on the second body with the parallel surfaces of the first body being perpendicular to the axis along which the first body moves and with the parallel surfaces of the second body being perpendicular to the axis along which the second body moves whereby the engagement of the protruding members with the parallel surfaces move the bodies along their axes in response to the rotational movement of the crank arm.

The invention further resides more specifically in the parallel surfaces of the second body and the associated protruding member of the crank arm being so arranged that the protruding member is received between such parallel surfaces, and drives the second body, during only a portion of each forward and return stroke of the crank arm, with the base and second body including coengageable means which restrain the second body against movement relative to the first body during those times when the parallel surfaces of the second body are out of engagement with the associated protruding member of the crank arm.

DETAILED DESCRIPTION OF THE PREFERRED EMBODIMENT

Figure 1:
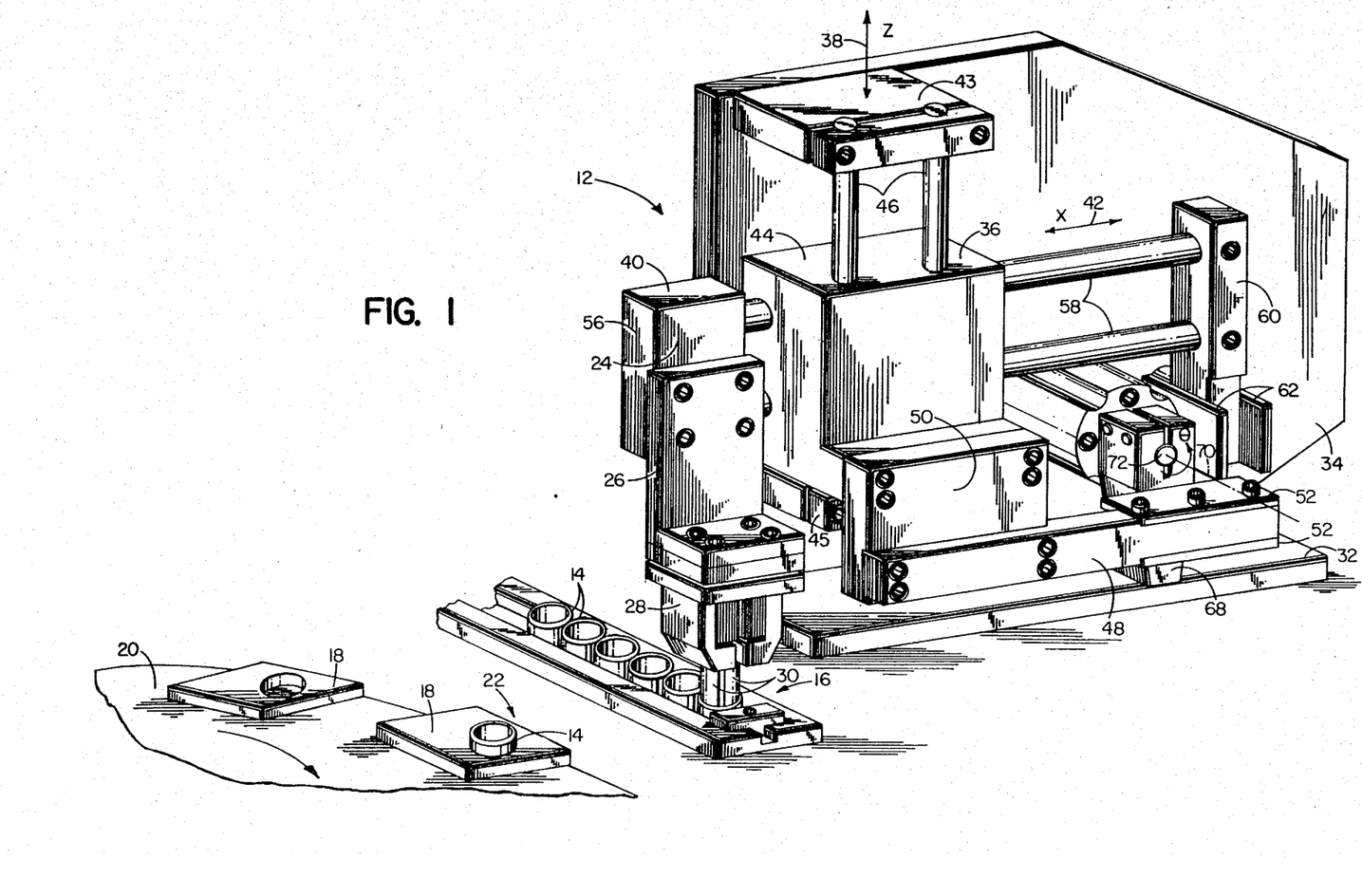
FIG. 1 is a perspective view of a pick and place device including a transfer mechanism embodying this invention.

Referring to FIG. 1, a transfer mechanism embodying the present invention is shown configured as a pick and place device 12 used in an automatic assembly environment in which it transfers parts 14, 14 one at a time from a supply station indicated generally at 16 to receivers 18, 18 on an indexing turret 20. In operation the turret 20 positions one receiver 18 at a part receiving station 22, the pick and place device 12 then transfers one part 14 from the supply station 16 to the receiver 18 at a delivery station, and then the device 12 returns to pick up a new part at the supply station 16 while the turret 20 indexes to bring a new receiver 18 to the delivery station, and the cycle is then again repeated. The device 12 has a tool mounting surface 24 to which is attached, by means of a bracket 26, a pick-up head in the form of a gripper 28. The structure of such pick-up head may, of course, vary widely depending on the nature of the parts being handled. For example, however, in the illustrated case the parts 14, 14 are shown to be tubular cylindrical ones and the gripper 28 is shown to be one having two relatively movable fingers 30, 30 which may be inserted into the bore of an article and spread apart to grasp it and remove it from the supply station 16 and which may later be moved together to release the article after it has been moved to and placed in the awaiting receiver 18 at the delivery station 22. As explained in more detail hereinafter the tool mounting surface 24, and therefore the attached gripper 28, moves in an inverted U-shaped path so that in moving from the supply station 16 to the delivery station 22 a part 14 is first moved upwardly from the supply station, then moved laterally or horizontally toward the delivery station 22 and then finally moved downwardly to the delivery station. Apart from the bracket 26 and gripper 28 attached to the tool mounting surface 24 the remainder of the device 12 may be considered a basic transfer mechanism for moving various things in an inverted U-shaped path and various different pickup heads, tools or the like may be attached to the tool mounting surface 24 to adapt the transfer mechanism to different situations.

Referring now to all of FIGS. 1 to 4 for a more detailed description of the transfer mechanism portion of the device 12 of FIG. 1, the mechanism includes a base consisting of a horizontal plate 32 and a vertical plate 34 fixed to one another. A first body 36 is supported for movement relative to the base along a vertical or Z-axis, indicated by the arrow 38 and a second body 40 is supported by the first body 36 for movement relative to it along a horizontal or X-axis, indicated by the arrow 42, fixed to the first body.

Figure 2:
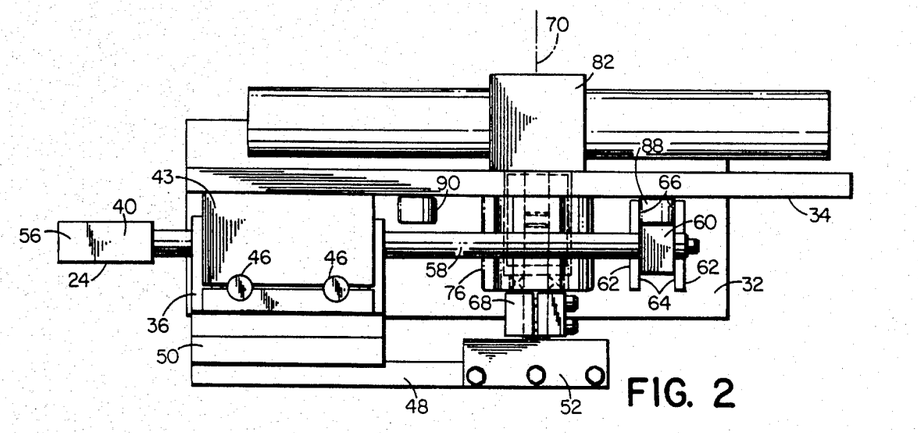
FIG. 2 is a top view of the transfer mechanism of FIG. 1.
Figure 3:
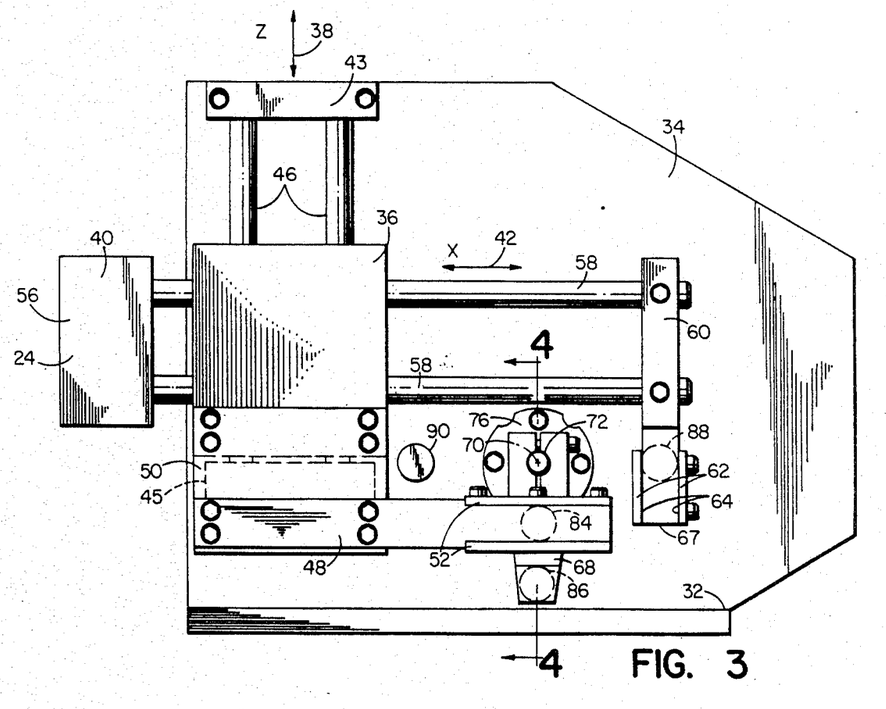
FIG. 3 is a front elevational view of the transfer mechanism of FIG. 1.

The first body 36 includes a block 44 supported for movement relative to the base along the Z-axis by two vertical guide rods 46, 46 fixed relative to the base plate 34 as shown by brackets 43 and 45. In addition to the block 44 the first body 36 also includes a horizontal arm 48 fixed to the block 44 through an intermediate piece 50. Fixed to the right-hand end of the arm 48, as seen in FIGS. 1, 2 and 3, are two vertically spaced plates 52, 52 and, as seen best in FIG. 4, these plates extend inwardly beyond the arm 48 and toward the vertical base plate 34 to provide two parallel surfaces 54, 54 facing one another and arranged parallel to the horizontal X-axis 42.

The second body 40 is made up of a head 56, two horizontal guide rods 58, 58 and an end piece 60 all rigidly fixed to one another. The head 56 and the end piece 60 are both in the form of relative thick plates and the head 56 provides the tool mounting surface 24. The two guide rods 58, 58 are slidably received by the block 44 of the first body 36 to support the body 40 for movement along the X-axis 42 relative to the first body. Attached to the lower end of the end piece 60 are two horizontally spaced plates 62, 62. As shown best in FIG. 2, the two plates 62, 62 extend forwardly beyond the end piece 62 to provide two parallel surfaces 64, 64 facing one another and arranged parallel to the vertical Z-axis 38. The two plates 62, 62 also extend rearwardly beyond the end piece 60, as shown in FIG. 2, to provide two additional parallel surfaces 66, 66 facing one another and arranged parallel to the vertical Z-axis 38.

Figure 4:
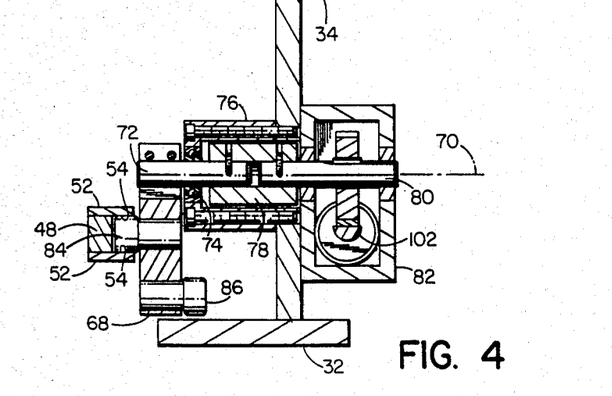
FIG. 4 is a fragmentary sectional view taken on the line 4—4 of FIG. 3.

The first and second bodies 36 and 40 are moved along their respective Z- and X-axes by a single crank arm 68 rotatable about a third axis 70 fixed relative to the base and perpendicular to the X- and Z-axes. More particularly, as shown in FIG. 4, the crank arm 68 is fixed to a drive shaft 72 rotatably supported for rotation about the axis 70 by a bearing 74 carried by a housing 76 attached to the vertical base plate 34. Within the housing 76 the drive shaft 72 is connected by a coupling 78 to the output shaft 80 of a rotary actuator 82 described in more detail hereinafter. The actuator is such that the output shaft 80, and therefore also the drive shaft 72, is repetitively oscillated through cycles each of which cycles includes a forward stroke of approximately 360° and a return stroke, in the reverse rotary direction, also of about 360°. FIG. 3 shows the arm 68 in its 0° position—that is, the position assumed at the beginning of a cycle of operation.

For driving both the first body 36 and the second body 40 in response to the rotation of the crank arm 68, the crank arm has two protruding members. These protruding members may take various different forms, but preferably and as shown both are rollers, indicated respectively at 84 and 86, supported by the crank arm for rotation about axes fixed to the crank arm and parallel to the crank arm rotational axis 70.

The first crank arm roller 84 fits between the two parallel surfaces 54, 54 of the first body 36, as shown in FIG. 4, and the plates 52, 52 providing the surfaces are of such length, as seen in FIG. 3, that the roller 84 remains between the surfaces 54, 54 throughout the full 360° movement of the crank arm. Therefore, it will be obvious that as the crank arm moves back and forth about the axis 70 in its 360° forward and return strokes the first body 36 will be moved vertically along the guide rods 46, 46, in the vertical or Z-coordinate direction, with simple harmonic motion.

As the first body 36 moves in the vertical or Z-axis direction, the second body 40 moves with it. The two parallel plates 62, 62 at their lower ends terminate in a downwardly facing mouth 67. The location of this mouth is such that when the crank arm 68 is at its 90° position the mouth 67 is located in the horizontal plane containing the axis 70. That is, at this 90° position of the crank arm the mouth 67 is on the same level as the axis 70 and the roller 86 will be positioned so as to enter the mouth 67. Therefore, during continued rotation of the crank arm 68 in the counterclockwise direction of FIG. 3, from its 90° position to its 270° position, the roller 86 will remain between the vertical surfaces 64, 64 and will drive the first body 40 with simple harmonic motion along the X or horizontal axis 42. When the crank arm reaches the 270° position the mouth 67 will again be located at the same level as the axis 70 and the roller 86 will be positioned so as to leave the mouth 67. Thereafter as the crank arm moves from the 270° position to the 360° position the roller 86 will no longer be between the surfaces 64, 64 and will no longer move the second body 40 along the X-axis.

From the foregoing it will be understood that as the crank arm 68 moves counterclockwise in a forward stroke from the 0° position shown in FIG. 3, the roller 86 will be out of engagement with the parallel surfaces 64, 64 during the first 90° of its motion and therefore will have no effect on moving the second body 40 along the X-axis. As the crank arm moves from the 90° position to the 270° position the roller 86 will engage the parallel surfaces 64, 64 and will move the first body with simple harmonic motion to the left in FIG. 3. As the crank arm moves from the 270° position to the 360° position the roller 86 will again be free of the parallel surfaces 64, 64 and will have no effect on movement of the second body along the X-axis. During the reverse rotation of the crank arm in its return stroke it will have no effect on the X-axis movement of the second body as it moves from 360° to 270°, the roller 86 will then enter between the parallel surfaces 64, 64 and move the second body to the right as the crank arm moves from the 270° position to the 90° position; and then at the 90° position to the roller 86 will leave the parallel surfaces 64, 64 and will have no effect on the motion of the body as the crank arm moves from the 90° position to the 0° position.

Means are provided for preventing the second body 40 from moving along the X-axis, and restraining it to movement along the Z-axis along with the first body 36, while the crank arm 36 moves in the first and fourth quadrants of its motion—that is, as the crank arm moves between 0° and 90° and between 270° and 360°. This means for so restraining the motion of the second body comprises two additional protruding members fixed to the base. Again these protruding members may take various different forms but preferably and as shown are two rollers 88 and 90 respectively which are rotatably about axes parallel to the crank arm axis 70 and which axes are also located in the same horizontal plane as the axis 70. These two base mounted rollers 88 and 90 cooperate with the two rearward vertical parallel surfaces 66, 66 of the second body 40. The two surfaces 66, 66 have a downwardly facing mouth on the same level, relative to the second body 40, as the mouth 67 of the surfaces 64, 64. Therefore, during the time the crank arm rotates from its 0° to its 90° position the roller 88 is received between the surfaces 66, 66 and restrains the second body 40 to vertical motion relative to the base along with the first body 36. At the 90° position of the crank arm the roller 88 leaves the surfaces 66, 66 at the same time as the crank arm roller 86 enters the surfaces 64, 64, and therefore the roller 88 does not prevent the motion of the second body along the X-axis as the crank arm moves from the 90° position to the 270° position. At the 270° position, however, the parallel surfaces 66, 66 move onto the roller 90 at the same time as the crank arm roller 86 moves out of the surfaces 64, 64. Therefore, during rotation of the crank arm from the 270° position to the 360° position the roller 90 in cooperation with the surfaces 66, 66 restrains the second body 40 to motion along the vertical axis.

Figure 5:
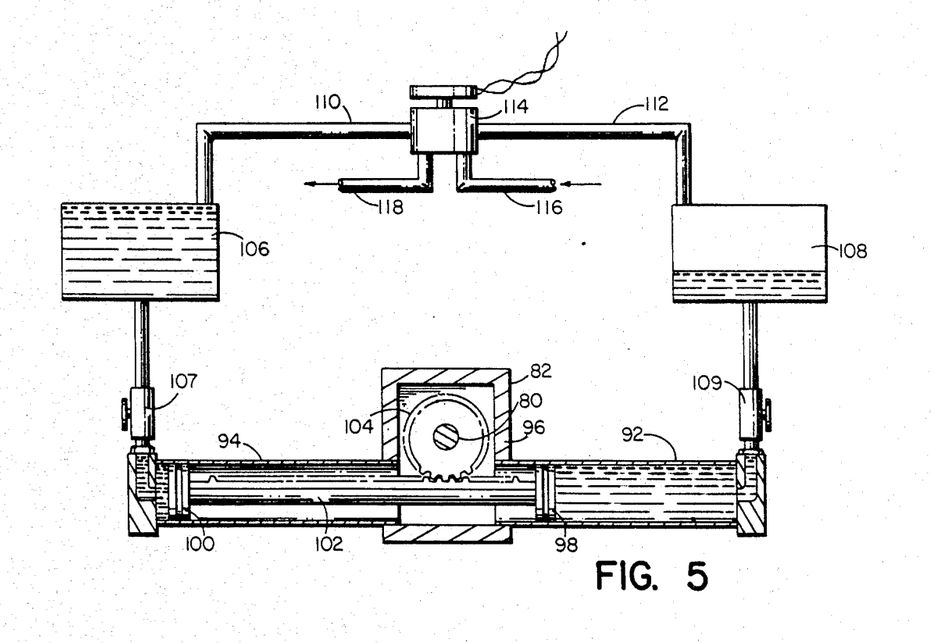
FIG. 5 is a view partially schematic and partially in section showing the actuating system for the transfer mechanism of FIG. 1.

The rotary actuator for driving the crank arm 68 may take various different forms but by way of illustration, and in the presently preferred case the actuator 82 is a linear to rotary air over oil device as shown in FIG. 5. Referring to this figure, the actuator 82 includes two aligned cylinders 92 and 94 carried by a housing 96 and receiving pistons 98 and 100 joined by a rack 102. The rack in turn meshes with and drives a gear 104 fixed to the output shaft 80. The stroke of the rack 102 is such that the gear 104 and shaft 80 are driven approximately 360° during each leftward and each rightward stroke of the rack 102. The pistons 98 and 100 are driven by oil supplied from reservoirs 106 and 108 through adjustable flow regulating valves 107 and 109. The upper ends of the reservoirs 106 and 108 are connected to air lines 110 and 112 connected in turn to a solenoid operated valve 114 also connected to a compressed air line 116 and an exhaust line 118. The solenoid operated valve is repetitively switched between one state at which it connects the line 110 to the compressed air line 116 and the line 112 to the exhaust line 118 and another state at which it connects the line 112 to the compressed air line 116 and the other line 110 to the exhaust line 118. It will therefore be understood that compressed air is first applied to the reservoir 108 to force oil into the cylinder 92 to drive the piston 98 and rack 102 to the left, while oil is at the same time exhausted from the cylinder 94 to the reservoir 106. Then in the reverse stroke oil is force by compressed air from the reservoir 106 to drive the piston 100 and rack 102 to the right while oil is exhausted from the cylinder 92 to the reservoir 108.

Figure 6:
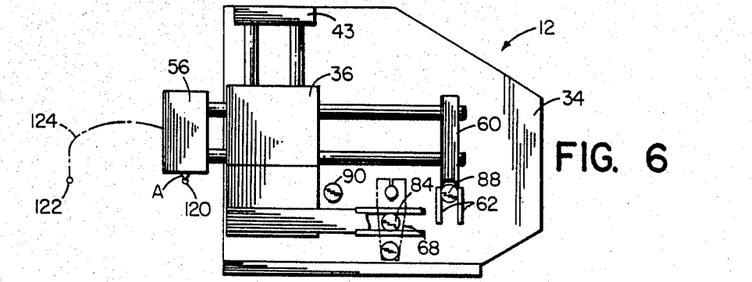
FIGS. 6 through 10 are reduced scale front elevational views, similar to FIG. 3, with some parts being shown broken away, showing in sequence the positions taken by various parts of the mechanism as the mechanism undergoes one half of a cycle of operation.
Figure 7:
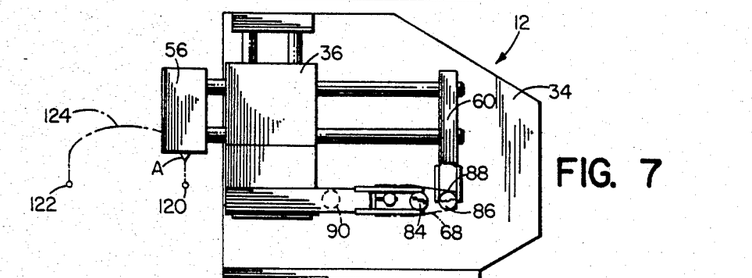
Figure 8:
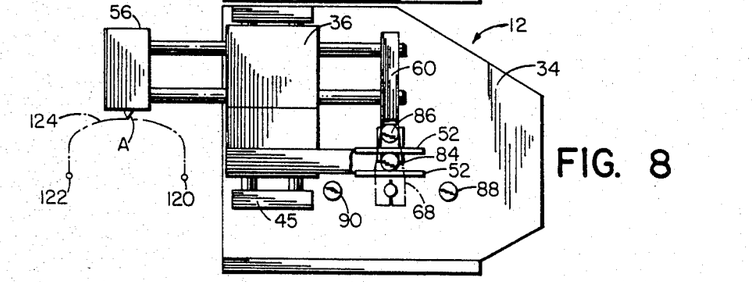
Figure 9:
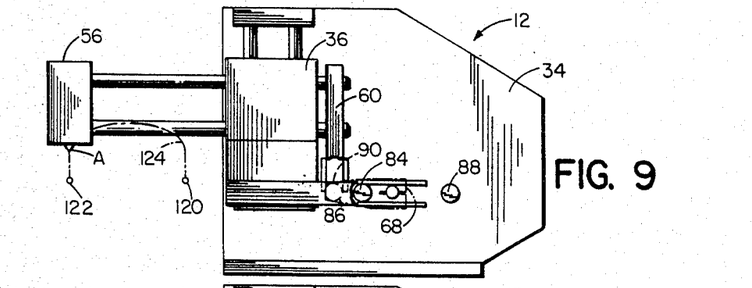
Figure 10:
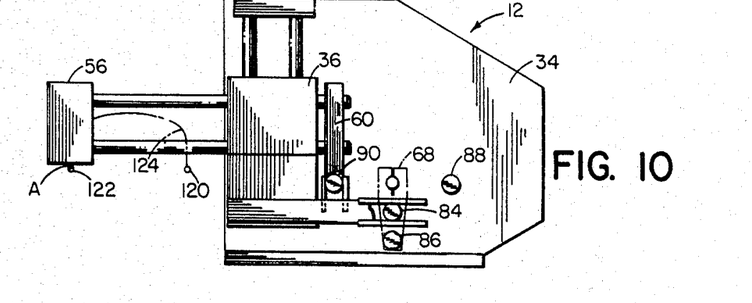

Having now described the structure of the transfer mechanism of FIG. 1 its sequence of operations may be reviewed by references to FIGS. 6 through 10. These figures show in sequence the path taken by a point A fixed to the head 56 as the mechanism moves through the forward stroke of its cycle—that is, as the crank arm 68 moves counterclockwise from its 0° position to its 360° position. FIG. 6 shows the position of the parts of the mechanism at the 0° position of the crank arm. Similarly, FIG. 7 shows the 90° position of the crank arm, FIG. 8 shows the 180° position of the crank arm, FIG. 9 the 270° position of the crank arm and FIG. 10 the 360° position of the crank arm. From this it will be noted that the point A moves between two end points 120 and 122 along an inverted U-shaped path 124 during the illustrated forward stroke. During the following return stroke—that is, as the crank arm 68 moves in the clockwise direction from the 360° position of FIG. 10 to the 0° position of FIG. 6 the head 56 and point A will retrace the U-shaped path 124 in the reverse direction to move the point A from the end point 122 to the end point 120.

I claim:

1. A transfer mechanism having a tool mounting surface movable along a path extending in two coordinate directions between two spaced end stations, said transfer mechanism comprising a base, a first body, means supporting said first body for movement relative to said base along a first axis fixed relative to said base, a second body, means supporting said second body for movement relative to said first body along a second axis fixed relative to said first body and generally perpendicular to said first axis, a crank arm, means supporting said crank arm for movement relative to said base about a third axis fixed relative to said base and generally perpendicular to the plane of said first and second axes, means for driving said crank arm back and forth about said third axis so that said arm executes repetitive alternate back and forth strokes of equal angular extent, a first set of coengageable parts on said crank arm and on said first body which first set of parts engage one another and move said first body along said first axis relative to said base in response to rotation of said crank arm about said third axis throughout the full extent of each of said back and forth strokes of said crank arm, a second set of coengageable parts on said crank arm and on said second body which second set of parts engage one another and move said second body along said second axis relative to said first body in response to rotation of said crank arm about said third axis throughout a first portion of each back and forth stroke of said crank arm, said second set of coengageable parts being disengaged from one another throughout a second portion of each of said back and forth strokes of said crank arm, a third set of coengageable parts on said second body and on said base which third set of parts engage one another throughout said second portion of each of said back and forth strokes of said crank arm to prevent unrestrained movement of said second body relative to said first body along said second axis, and a tool mounting surface on said second body.

2. A transfer mechanism as defined in claim 1 further characterized by said first axis being horizontal, and said first set of coengageable parts on said first body and on said crank arm including a means providing a horizontal downwardly facing surface fixed to said first body, and a protruding member on said crank arm engageable with said horizontal downwardly facing surface.

3. A transfer mechanism as defined in claim 1 further characterized by said first set of coengageable parts on said first body and on said crank arm including means providing a pair of spaced parallel surfaces facing one another, fixed to said first body and arranged generally perpendicular to said first axis, and a protruding member on said crank arm located between said pair of parallel surfaces.

4. A transfer mechanism as defined in claim 3 further characterized by said protruding member being a roller supported on said crank arm for rotation about an axis fixed relative to said crank arm and spaced from and parallel to said third axis.

5. A transfer mechanism as defined in claim 1 further characterized by said second set of coengageable parts on said second body and on said crank arm including means providing a pair of parallel surfaces facing one another, fixed relative to said second body and arranged generally perpendicular to said second axis, and a protruding member an said crank arm located between said pair of parallel surfaces throughout said first portion of each back and forth stroke of said crank arm.

6. A transfer mechanism as defined in claim 5 further characterized by said protruding member being a roller supported by said crank arm for rotation about an axis fixed relative to said crank arm and spaced from and parallel to said third axis.

7. A transfer mechanism as defined in claim 1 further characterized by said first set of coengagable parts on said first body and on said crank arm including a means providing a first pair of parallel surfaces fixed relative to said first body, facing one another and arranged generally perpendicular to said first axis, and a first protruding member on said crank arm located between said first pair of parallel surfaces, and said second set of coengaging parts on said second body and said crank arm including a means providing a second pair of parallel surfaces facing one another, fixed relative to said second body and arranged generally perpendicular to said second axis, and a second protruding member on said crank arm located between said second pair of parallel surfaces through said first portion of each back and forth stroke of said crank arm.

8. A transfer mechanism as defined in claim 7 further characterized by said first protruding member being a roller supported by said crank arm for rotation about an axis fixed relative to said crank arm and spaced from and parallel to said third axis, and said second protruding member being a second roller carried by said crank arm for rotation about an axis fixed relative to said crank arm and spaced from and parallel to said third axis.

9. A transfer mechanism as defined in claim 5 further characterized by said third set of coengageable parts including means providing a pair of parallel surfaces facing one another, fixed relative to said second body and arranged generally perpendicular to said second axis, and at least one protruding member fixed to said base and located between said pair of parallel surfaces of said third set throughout at least some of said second portion of each back and forth stroke of said crank arm.

10. A transfer mechanism as defined in claim 9 further characterized by said third set of coengageable parts including two protruding members fixed to said base each received at a different time from the other between said pair of parallel surfaces of said third set throughout said second portion of each back and forth stroke of said crank arm.

11. A transfer mechanism having a tool mounting surface movable along a path extending in two coordinate directions between two spaced end stations, said transfer mechanism comprising a base, a first body, means supporting said first body for movement relative to said base along a first axis fixed relative to said base, a second body, means supporting said second body for movement relative to said first body along a second axis fixed relative to said first body and generally perpendicular to said first axis, a crank arm, means supporting said crank arm for movement relative to said base about a third axis fixed relative to said base and generally perpendicular to the plane of said first and second axes, first coengaging means between said crank arm and said first body for moving said first body along said first axis relative to said base in response to rotation of said crank arm about said third axis throughout at least a portion of a full revolution of said crank arm, second coengaging means separate from said first coengaging means between said crank arm and said second body for moving said second body along said second axis relative to said first body in response to rotation of said crank arm about said third axis throughout at least a portion of a full revolution of said crank arm, means for driving said crank arm back and forth about said third axis, and a tool mounting surface on said second body;

said second coengaging means between said second body and said crank arm including means providing a pair of parallel surfaces facing one another, fixed relative to said second body and arranged generally perpendicular to said second axis, and a protruding member on said crank arm located between said pair of parallel surfaces throughout at least a portion of a full revolution of said crank arm; and the movement of said crank arm being measured in terms of 360° for a full revolution about said third axis with the 0° (and 360°) position being one of the two at which said protruding member is located in the plane which contains said third axis and is perpendicular to said second axis, said two parallel surfaces being so arranged that they terminate in a first mouth generally facing the 0° position of said protruding member of said crank arm, said parallel surfaces being further so arranged that said mouth when said crank is in its 90° position and in its 270° position is positioned on the plane which contains said third axis and is parallel to said second axis, whereby said protruding member is located between said parallel faces and moves said second body relative to said first body along said second axis as said crank arm moves through a range at which its angle $\theta$ is $90° \leqq \theta \leqq 270°$ and whereby said protruding member is removed from between said faces and does not move said second body relative to said first body along said second axis as said crank arm moves through a range at which its angle $\theta$ is $0° \leqq \theta \leqq 90°$ or through a range at which its angle $\theta$ is $270° \leqq \theta \leqq 360°$, and a base supported pair of protruding members located on axes fixed relative to said base, and means providing another pair of parallel surfaces facing one another, fixed relative to said second body and arranged generally perpendicular to said second axis, said another pair of surfaces also terminating in a second mouth facing in the same direction as said first mouth, the first of said base supported protruding members being located so as to be at said second mouth when said crank arm is at its 90° position and the second of said base supported protruding members being located so as to be at said second mouth when said crank arm is at its 270° position, whereby said first base protruding member becomes positioned between said two parallel faces of said second body as said crank arm moves through a range at which its angle $\theta$ is $0° \leqq \theta \leqq 90°$ and said second base protruding member becomes positioned between said two parallel faces of said second body as said crank arm moves through a range at which its angle $\theta$ is $270° \leqq \theta \leqq 360°$.

12. A transfer mechanism as defined in claim 11 further characterized by said means for driving said crank arm back and forth about said third axis being operable during each cycle of oscillation to drive said crank arm from approximately its 0° position to approximately its 360° position in a forward stroke in one direction of rotation about said third axis and from approximately its 360° position to approximately its 0° degree position in a return stroke in the opposite direction of rotation.

13. A transfer mechanism having a tool mounting surface movable along a path extending in two coordinate directions between two spaced end stations, said transfer mechanism comprising a base, a first body supported for movement relative to said base along a first axis fixed relative to said base, a second body supported on said first body for movement relative to said first body along a second axis fixed relative to said first body and generally perpendicular to said first axis, a crank arm supported by said base for movement relative thereto about a third axis fixed relative to said base and generally perpendicular to the plane of said first and second axes, means for repeatedly driving said crank arm back and forth about said third axis through repeated cycles each including a forward stroke starting at approximately a 0° position and ending at approximately a 360° position and a return stroke in the opposite direction of rotation starting at said approximately 360° position and ending at said approximately 0° position, a first protruding member on said crank arm, means providing a pair of spaced parallel surfaces on said first body extending generally parallel to said second axis and engaging opposite sides of said first protruding member so as to move said first body along said first axis in response to rotation of said crank arm throughout the full extent of each forward stroke and each return stroke of said crank arm, a second protruding member on said crank arm, means providing a second pair of spaced parallel surfaces on said body, said second pair of parallel surfaces extending generally parallel to said first axis and being arranged to receive between them said second protruding member of said crank arm during a portion of each forward stroke and during a corresponding portion of each return stroke of said crank arm so as to move said second body relative to said first body along said second axis during the time said second protruding member is received between said second pair of parallel surfaces, a tool mounting surface on said second body, means providing a third pair of parallel surfaces on said second body which third pair of surfaces face one another and extend generally parallel to said first axis, protruding means on said base arranged to enter between said third pair of parallel surfaces to prevent movement of said second body relative to said first body along said second axis during the times said second protruding member of said crank arm is out of engagement with said second pair of parallel surfaces on said second body, said second parallel surfaces on said second body being arranged so that said second protruding member on said crank arm during movement of said crank arm in a forward stroke starts to enter said second pair of parallel surfaces when said crank arm reaches its 90° position and starts to leave said second pair of parallel surfaces when said crank arm reaches its 270° position, said protruding means on said base including a third protruding member fixed relative to said base and arranged so as to be received between said third pair of parallel surfaces as said crank arm moves from its 0° to its 90° position, and a second protruding member fixed relative to said base and arranged so as to be received between said third pair of parallel surfaces as said crank arm moves from its 270° position to its 360° position.

14. A transfer mechanism as defined in claim 11 further characterized by said second body having fixed thereto two parallel spaced plates with said pair of plates providing both said second pair of parallel surfaces and said third pair of parallel surfaces.

15. A transfer mechanism having a tool mounting surface movable along a path extending in two coordinate directions between two spaced end stations, said transfer mechanism comprising a base, a first body supported by said base for movement relative thereto along a first axis fixed relative to said base, a second body supported by said first body for movement relative to said first body along a second axis fixed relative to said first body and generally perpendicular to said first axis, a crank arm supported by said base for movement relative thereto about a third axis fixed relative to said base and generally perpendicular to the plane of said first and second axes, means for driving said crank arm back and forth about said third axis relative to said base through repeated cycles each including a forward stroke of substantially more than 180 and a corresponding return stroke, coengaging means between said crank arm and said first body for moving said first body relative to said base along said first axis in response to movement of said crank arm during the full extent of each of its forward and return strokes, a protruding member on said crank arm, means providing a pair of spaced parallel surfaces on said second body which parallel surfaces face one another and extend generally parallel to said first axis, said parallel surfaces being further arranged to receive said protruding member of said crank arm during an intermediate portion of each forward and return stroke of said crank arm so as to move said second body relative to said first body along said second axis in response to such rotation of said crank arm, said pair of parallel surfaces being further so arranged that they are free of said crank arm protruding member during a first end portion and a second end portion of each forward and each return stroke of said crank arm which first and second end portions are located on opposite sides of said intermediate portion of each forward and return stroke, and coengaging means on said second body and said base for restraining said second body against movement relative to said first body along said second axis throughout said end portions of said forward and return strokes, and a tool mounting surface on said second body.

16. A transfer tool mechanism having a tool mounting surface movable along a path extending in two coordinate directions between two spaced end stations, said transfer mechanism comprising a base, a first body supported for movement relative to said base along a first axis fixed relative to said base, a second body supported on said first body for movement relative to said first body along a second axis fixed relative to said first body and generally perpendicular to said first axis, a crank arm supported by said base for movement relative thereto about a third axis fixed relative to said base and generally perpendicular to the plane of said first and second axes, means for repeatedly driving said crank arm back and forth about said third axis through repeated cycles each including a forward stroke starting at a first angular position and ending at a second angular position and a return stroke in the opposite direction of rotation starting at said second position and ending at said first position, a first protruding member on said crank arm, means providing a pair of spaced parallel surfaces on said first body extending generally parallel to said second axis and engaging opposite sides of said first protruding member so as to move said first body along said first axis in response to rotation of said crank arm throughout the full extent of each forward stroke and each return stroke of said crank arm, a second protruding member on said crank arm, means providing a second pair of spaced parallel surfaces on said second body, said second pair of parallel surfaces extending generally parallel to said first axis and being arranged to receive between them said second protruding member of said crank arm during an intermediate portion of each forward stroke and during a corresponding intermediate portion of each return stroke of said crank arm so as to move said second body relative to said first body along said second axis during the time said second protruding member is received between said second pair of surfaces, each of said forward and return strokes of said crank arm having end portions on opposite sides of said intermediate portion throughout which end portions said second protruding member is out of engagement with said second pair of parallel surfaces on said second body, means providing a third pair of parallel surfaces on said second body which third pair of surfaces face one another and extend generally parallel to said first axis, protruding means on said base arranged to enter between said third pair of parallel surfaces to prevent movement of said second body relative to said first body along said second axis throughout said end portions of said forward and return strokes of said crank arm, and a tool mounting surface on said second body.

17. A transfer mechanism as defined in claim 16 further characterized by said first angular position of said crank arm being between 0° and 90°, said second angular position of said crank arm being between 270° and 360°, and said intermediate portion of each forward and return stroke extending between 90° and 270°.

* * * * *